United States Patent Office 3,278,475
Patented Oct. 11, 1966

3,278,475
UREA-FORMALDEHYDE ADHESIVES MODIFIED WITH A COMPOUND SELECTED FROM THE GROUP OF AMMELIDE, AMMELINE AND MIXTURES THEREOF
Clarence W. Spilker, Colonial Heights, and George K. Cleek, Chester, Va., assignors to Allied Chemical Corporation, New York, N.Y., a corporation of New York
No Drawing. Filed July 29, 1964, Ser. No. 386,074
11 Claims. (Cl. 260—29.4)

This invention relates to the bonding of materials by adhesives and more particularly to new resin forming compositions which compositions contain a large portion of a urea-formaldehyde reaction product, urea and a small amount of ammelide and are useful in adhesive compositions.

Urea-formaldehyde resin compositions useful as adhesive in the bonding together of various materials such as wood veneers to form plywood, wood chips to form chipboard, foundry sand and the like, have been well known in the art for some time. In many cases, as exemplified by numerous patents, specifically U.S.P. 2,813,840 of November 19, 1957 to Harold K. Solzberg entitled "Foundry Sand Binder and Process of Production" the compositions are already resinous when used. That is, when preparing an adhesive material comprising a urea-formaldehyde condensate and urea, it has been considered heretofore necessary, in the majority of instances, to cook or reflux the material or evaporate water therefrom by other means, to thereby react the raw material to the resinous stage prior to use. All such resin formulations in the preparation of adhesives require the use of specialized equipment and processing technique and the time for such processing.

In consideration of the foregoing and the disadvantages attendant with many prior art adhesives employing urea-formaldehyde resins which are substantially less expensive than urea-melamine resins, it is an object of this invention to provide stable adhesive slurries that comprise non-resinous urea-formaldehyde condensate, urea and ammelide or ammeline or mixtures thereof which adhesives have an extended pot life thereby being suitable for use in the manufacture of plywood, chipboard and the like.

It is another object of this invention to provide an adhesive composition containing urea-formaldehyde condensate, urea and ammelide, together with fillers and extenders well known in the art, which product in conjunction with suitable adhesive hardener catalysts can be placed on plywood and remain there for a period of 40 hours or more without substantial precuring or hardening due to the presence of the urea-formaldehyde curing catalysts.

It is another object of this invention to provide an adhesive composition which can be stored for a substantial period of time and which cures in situ under normal conditions of heat and pressure.

These and other objects of this invention will become apparent to those skilled in the art from the following disclosure and appended claims.

In accordance with this invention, we provide for an adhesive composition a resin forming composition which resin forming composition comprises:

(1) An aqueous non-resinous urea-formaldehyde reaction product having 60–90% by weight total solids, a mol ratio between 4.0 and 7.3 mols of formaldehyde per mol of urea and a pH of at least 7.0;

(2) An amount of an ingredient selected from the group consisting of ammelide, ammeline and mixtures thereof, and urea so that the total mol ratio of formaldehyde in the composition for every $NH_2$-group present in the composition is in the range of from 0.7 to 1.0 and the total mol ratio of urea to said ingredient present is in the range of from 10 to 30, said ingredient being at least partially insoluble in said composition.

By the term "resin forming composition" is meant those ingredients which when acted upon by heat and hardener catalyst under certain resin forming conditions cause resinification of the resin-forming composition. Hence, extenders, fillers, catalysts, etc., present eventually in an adhesive composition comprising our resin forming composition are not necessarily included in the definition. For the purposes of this invention, the $NH_2$-groups are due to the presence of urea and ammelide, ammeline or mixtures of ammeline and ammelide. The urea in the liquid non-resinous urea-formaldehyde reaction product and urea added in the composition is considered equivalent to 2 mols of $NH_2$-groups per mol of urea; the ammelide being considered equivalent to 1 mol of $NH_2$-group per mol of ammelide and the ammeline being considered equivalent to 2 mols of $NH_2$-group per mol of ammeline. Adhesive compositions containing as the binding agents the urea-formaldehyde reaction product recited above in No. 1 and the ammelide or ammeline and urea recited above in No. 2, can contain any of the conventional curing catalysts heretofore provided. Specifically, adhesive compositions of this invention can contain as the catalyst for the curing, ammonium chloride, ammonium sulphate, ammonium phosphate, lactic acid, acetic acid, and the like, as is conventional. In addition thereto, resin forming compositions contemplated within the scope of this invention, can contain extenders and/or fillers such as wheat flour, shell flour, wood flour, alpha-cellulose and the like and can be added to the urea-formaldehyde reaction products containing urea and ammelide, if desired, as is also conventional in the art. Since this invention contemplates a resin forming composition containing in addition to the urea and urea formaldehyde ammelide or ammeline or mixtures thereof for simplicity these compounds or mixtures thereof are referred to in the balance of this specification as "ammelide-ine compound," it being understood that one can use either compound alone or in admixture with the other.

In accordance with this invention, the resin forming composition above recited can be prepared by first admixing an aqueous non-resinous urea-formaldehyde reaction product having 60–90% by weight total solids, mol ratio between 4.0 and 7.3 mols of formaldehyde per mol of urea and a pH of at least 7.0, with the designated amounts of ammelide-ine compound and urea, the amounts of ammelide-ine compound and urea being present so that the mol ratio of formaldehyde to $NH_2$-groups in the urea and ammelide-ine compound in the range of from 0.7 to 1.0 and the mol ratio of urea for every mol of ammelide-ine compound present within the range of 10 to 30. The ingredients should be mixed together to achieve an homogeneous mass, keeping the temperature below 100° F. particularly if adhesive curing catalyst has already been added, since at temperatures above 100° F. reaction of the urea-formaldehyde reaction product with the urea and ammelide-ine compound starts with the consequence of premature curing. At the time the urea-formaldehyde reaction product is added to the urea and ammelide-ine compound there can also be added, and is preferably added, an amount of curing catalysts usually present in the mixture in amounts equivalent to 0.25 to 5 weight percent of the urea-formaldehyde reaction product, ammelide-ine compound and urea present in the batch. The urea-formaldehyde reaction product can be prepared in accordance with the procedure set out in Mearl A. Kise, U.S.P. 2,652,377, of September 15, 1953 entitled "Production of Solutions of Formaldehyde-Urea Reaction Products" and is commercially available as U–F Concentrate 85.

After the urea-formaldehyde reaction product is admixed with the ammelide-ine compound and urea and curing catalysts, e.g. $NH_4Cl$, the resultant composition is then applied as substantially unreacted mixtures of the resin forming composition of No. 1 and No. 2 above recited on the surfaces of the materials to be bonded. Thereafter, the mixtures are cured in situ in the presence of curing catalysts while the mixture-coated materials are in juxtaposition, causing bonding of said materials together. This bonding technique is conventional in the art and is performed at temperatures normally above 100° F. and is accompanied by pressure, especially in the case of plywood manufacture.

The liquid non-resinous urea-formaldehyde product as discussed above, that is to be used for preparing resin forming composition in accordance with the present invention, is mixed with ammelide-ine compound and urea in amounts sufficient to reduce the formaldehyde to $NH_2$-group ratio to 0.7 to 1.0 mol of formaldehyde for every $NH_2$-group present. If the mol ratio is less than 0.7 the strength of the final adhesive is adversely affected, i.e., a significant drop in strength is noted. If the formaldehyde to $NH_2$-group ratio is greater than 1.0 mol of formaldehyde for $NH_2$-group present the adhesive while maintaining sufficient strength will release, on bonding at temperatures of 100° F. and higher, fumes which make use of it undesirable in closed areas. Furthermore, some lessening of strength is noted but not to the degree where the mol ratio is less than 0.7. At the same time the urea-formaldehyde reaction product is mixed with the ammelide-ine compound and urea, the mol ratio of urea to ammelide-ine compound is maintained between about 10 and 30 mols of urea for every mol of ammelide-ine compound. If the mol ratio of urea to ammelide-ine compound is substantially below 10, the expense of the product for adequate adhesion becomes prohibitive in normal commercial operations.

If the mol ratio of urea to ammelide-ine compound is substantially greater than 30 mols of urea for every mol of ammelide-ine compound the excellent water resistance of the resultant adhesive is substantially adversely affected particularly with respect to hot water.

In preparing the resin forming composition of this invention the ammelide-ine compound so added to the urea and urea-formaldehyde product is preferably ground to facilitate uniform distribution of the ammelide-ine compound throughout the composition. The ammelide-ine compound is preferably present in the particle size of at least small enough to pass through a U.S. sieve screen size 80. The ammelide-ine compound is present preferably in the resin forming composition as a fine slurry or suspension. The mixing is accomplished at room temperature, i.e., below that at which substantial reaction or resinification of the urea-formaldehyde reaction product with the ammelide-ine compound and urea occurs; i.e. at temperatures no higher than 100° F. In preparing this composition sufficient water can be added to the composition to impart to the mixture a consistency suitable for subsequent application to the material to be bonded together, as is conventional in the preparation of adhesives. The amount of water to be added will naturally depend upon the ultimate use of the adhesive composition; i.e. whether it will be used in sand-cores, plywood production or chipboard manufacture. Yet we prefer generally that sufficient water be added to adjust the viscosity of the bonding compositions to between 40 and 300 centipoises. The viscosity of the resin forming composition of this inevntion should be in cases where it is used in an adhesive composition on wood surfaces, e.g., plywood sufficiently high enough to avoid "bleed through." "Bleed through" is a term of art referring to aqueous penetration into wood surfaces of the adhesive or resin forming composition. On the other hand, the resin forming composition should be below 2000 centipoises when used on surfaces, e.g. plywood veneers. At viscosities above 2000 centipoises the composition becomes difficult to readily handle for commercial operations.

In the practice of our invention we preferably use ammelide as the ingredient to be present together with the urea and urea-formaldehyde reaction product. We have found that ammelide is markedly superior to ammeline notwithstanding the close chemical structural relationship of the two compounds. This superiority is dramatically illustrated in the examples below by comparing results provided by a resin forming composition of our invention employing ammelide with a resin forming composition of our invention using ammeline. This is not to say, however, that the latter resin forming composition is of little value. On the contrary, the below example illustrates that it is a very useful composition and provides commercially acceptable results.

With respect to use of a mixture of ammeline-ammelide, the results vary with the amounts of ammelide and ammeline in the mixture, the best results being with compositions containing a greater portion of ammelide. The use of a mixture will be desired where one has access to a mixture at a small price. The mixture can be obtained as by products in the production of melamine and can be utilized in our resin forming compositions without difficulty.

As a result there is obtained a resin forming composition which does not prematurely cure or harden in the presence of catalyst, has a pot life of at least 2 hours; and for its use does not necessitate preresinification as has been customary. The resin forming compositions of this invention has been found to be unusually stable when placed on materials to be bonded together in the presence of catalyst. For example, materials covered with the resin forming composition in accordance with the present invention, can be allowed to stand for long periods of time, up to 40 hours or longer, without danger of pre-cure of the resin forming composition. This is a significant advantage in the manufacture of plywood or chipboard or the like, in that, say, strips of plywood board can have applied thereto the resin forming composition of this invention together with catalyst and the bonding of the next layer of wood need not take place for 40 hours or longer without losing the attendant advantages of the present composition.

In order to more fully illustrate the nature of our invention and the manner of practicing the same, the following example and comparative tests are set forth. Unless otherwise specified therein, temperature is in degrees Fahrenheit and percent is percent by weight. Furthermore, in these examples the urea-formaldehyde non-resinous reaction product used was the commercially available product known as U.F. Concentrate 85, prepared in accordance with Kise U.S.P. 2,652,377 of September 15, 1953, and containing the equivalent of about 60% by weight formaldehyde, 25% by weight urea and 15% by weight water with a pH of about 8 at 25° C.

EXAMPLE 1

An adhesive slurry was prepared by mixing at room temperature, 1500 parts of the above specified U.F. Concentrate 85, 729 parts of urea, 90 parts of ammelide and 200 parts of water, all by weight. The resulting slurry containing ammelide as the insoluble ingredient had an 0.8 to 1 formaldehyde to $NH_2$ mol ratio. The slurry was catalyzed with a solution of 22.5 parts by weight of ammonium sulphate in 44 parts of water. The catalyzed slurry contained 65% by weight oven-dry resin solids, had a viscosity of 90 centipoises, a pH of 4.2 and a room temperature pot life of about 2 hours.

To prepare a particle board, 110 parts by weight of water was sprayed onto 3700 parts by weight of a pine-mixed hardwood furnish which originally contained 7.6% by weight of moisture. Then 427 parts of the above described catalyzed adhesive slurry was sprayed onto the furnish in about 2 minutes to give an 8% by weight resin solid application. The spray furnish had a moisture content of 11.6%. A mat containing 1250 parts of sprayed furnish was formed by hand in a 12″ x 15″ forming box. The mat was transferred to an electrically-heated platen press. The platen temperature was 300° F. Sufficient pressure of about 500 p.s.i.g. was applied to close the press to 0.5″ stops in about 1.5 minutes. Boards were made using total press times of 7 and 9 minutes. These boards had the following properties:

| Cure Time, mins. | Moisture Content, percent by wt. | Air Dry Density, lbs./ft.$^3$ | Modulus of Rupture, p.s.i. | Modulus of Elasticity, ×10$^{-3}$, p.s.i. | Face Screw Hold, lbs. | Impact Strength, inch-lbs. |
|---|---|---|---|---|---|---|
| 7 | 7.8 | 50.9 | 2,760 | 497 | 535 | 26 |
| 9 | 7.8 | 51.3 | 2,950 | 491 | 608 | 27 |

*Comparative test 1*

Example 1 was repeated except that no ammelide was used and the amount of urea was increased slightly to 750 parts to maintain the same mol ratio of formaldehyde to NH$_2$-groups. Particle board was prepared and tested in the same manner as Example 1 with the following results:

| Cure Time, mins. | Moisture Content, percent by wt. | Air Dry Density, lbs./ft.$^3$ | Modulus of Rupture, p.s.i. | Modulus of Elasticity, ×10$^{-3}$, p.s.i. | Face Screw Hold, lbs. | Impact Strength, inch-lbs. |
|---|---|---|---|---|---|---|
| 7 | 7.4 | 49.0 | 2,270 | 448 | 475 | 19 |
| 9 | 6.9 | 49.5 | 2,030 | 383 | 501 | 23 |

It can readily be seen from a comparison of the test with the example that the boards prepared from the new adhesive containing one of the new resin forming compositions is markedly superior in all respects to that heretofore provided. This is exceptionally surprising in view of the small amount of ammelide used in the example and contemplated generally by the present invention.

EXAMPLE 2

An adhesive slurry was prepared in the manner of Example 1, except that the ammonium sulphate in the catalyst was reduced to 11.25 parts in 44 parts water. The catalyzed slurry had a viscosity of 60 centipoises and a pH of 4.6. Boards made with this adhesive slurry had the following properties:

| Cure Time, mins. | Moisture Content, percent by wt. | Air Dry Density, lbs./ft.$^3$ | Modulus of Rupture, p.s.i. | Modulus of Elasticity, ×10$^{-3}$, p.s.i. | Face Screw Hold, lbs. | Impact Strength, inch-lbs. |
|---|---|---|---|---|---|---|
| 7 | 7.4 | 50.5 | 2,670 | 518 | 530 | 23 |
| 9 | 7.4 | 51.0 | 2,740 | 476 | 558 | 23 |
| 5 | 7.4 | 50.4 | 2,545 | 548 | 485 | 21 |

EXAMPLE 3

An adhesive slurry was prepared by mixing at room temperature 1000 parts of U.F. Concentrate 85, 472 parts of urea, 60 parts of ammeline and 140 parts of water. The resulting slurry had an 0.8 to 1 formaldehyde to —NH$_2$ mol ratio. The slurry was catalyzed with a solution of 7.5 parts of ammonium sulfate in 22 parts of water. The catalyzed slurry contained 65% oven-dry resin solids, had a viscosity of 60 centipoises and a pH of 4.8.

To prepare a particle board, 110 parts of water was sprayed onto 3700 parts of a pine-mixed hardwood furnish which originally contained 7.6% moisture. Then 427 parts of the above-described catalyzed adhesive slurry was sprayed onto the furnish in about two minutes to give an 8% resin solids application. The sprayed furnish had a moisture content of 11.6%. A mat containing 1250 parts of sprayed furnish was formed by hand in a 12″ x 15″ forming box. The mat was transferred to an electrically heated platen press. Platen temperature was 300° F. Sufficient pressure (about 500 p.s.i.g.) was applied to close the press to 0.5-inch stops in about 1.5 minutes. Boards were made using total press times of 5, 7 and 9 minutes. The boards had the following properties:

| Cure Time, mins. | Moisture Content, percent by wt. | Air Dry Density, lbs./ft.$^3$ | Modulus of Rupture, p.s.i. | Modulus of Elasticity, ×10$^{-3}$, p.s.i. | Face Screw Hold, lbs. | Impact Strength, inch-lbs. |
|---|---|---|---|---|---|---|
| 5 | 7.5 | 50.4 | 2,440 | 462 | 520 | 18 |
| 7 | 7.5 | 50.7 | 2,375 | 490 | 495 | 20 |
| 9 | 7.5 | 50.0 | 2,310 | 433 | 585 | 20 |

EXAMPLE 4

An adhesive slurry is prepared by mixing at room temperature 1000 parts of U.F. Concentrate 85, 472 parts of urea, 40 parts ammelide and 40 parts ammeline and 140 parts of water. The resulting slurry has an 0.8 to 1 formaldehyde to —NH$_2$ mol ratio. The slurry is catalyzed with a solution of 7.5 parts of ammonium sulfate in 22 parts water. The catalyzed slurry has a pH of about 5 and is useful as a resin forming composition yielding results intermediate between the results of Example 1 and Example 3.

It is readily seen from the foregoing that we have provided a significant contribution to the art of urea-formaldehyde adhesive compositions and in particular we have provided new resin forming compositions, which have superior properties than resin forming compositions heretofore provided, as illustrated by the comparison of Example 1 with Test 1. Our resin forming compositions have a pot life of at least about 2 hours in the presence of catalysts, do not readily pre-cure at temperatures below 100° F., can be applied to materials to be bonded and left there for 40 or more hours without any pre-curing or deleterious effects. Other advantages from our invention will be apparent to those skilled in the art after having viewed the instant disclosure.

While certain embodiments of our invention have been disclosed herein, these have been disclosed only for purposes of illustrating our invention and are not to be construed as limiting the same, since certain modifications

We claim:

1. A resin forming composition for use in an adhesive, said resin forming composition comprising an aqueous non-resinous urea-formaldehyde reaction product slurry having 60–90% by weight total solids, a mol ratio between 4.0 and 7.3 mols of formaldehyde per mol of urea, and, a pH of at least 7.0; an amount of an ingredient selected from the group consisting of ammelide, ammeline and mixtures thereof and urea so that the total mol ratio of formaldehyde in the composition for every $NH_2$-group present in the composition is in the range of from 0.7 to 1.0 and the total mol ratio of urea to said ingredient present is in the range of from 10 to 30 said ingredient being at least partially insoluble in said composition.

2. A resin forming composition for use in an adhesive according to claim 1 wherein said ingredient is ammeline.

3. A resin forming composition according to claim 1 wherein said ingredient is a mixture of ammeline and ammelide.

4. A resin forming composition for use in an adhesive, said resin forming composition comprising an aqueous non-resinous urea-formaldehyde reaction product slurry having 60–90% by weight total solids, a mol ratio between 4.0 and 7.3 mols of formaldehyde per mol of urea and a pH of at least 7.0, an amount of ammelide and urea so that the total mol ratio of formaldehyde in the composition for every $NH_2$-group present in the composition is in the range of from 0.7 to 1.0 and the total mol ratio of urea to ammelide present is in the range of from 10 to 30, said ammelide being at least partially insoluble in said composition.

5. A resin forming composition according to claim 4 having a viscosity between 40 and 300 centipoises.

6. A resin forming composition according to claim 5 wherein said ammelide is of the size sufficient to pass through U.S. sieve screen size 80.

7. An adhesive containing the resin forming composition of claim 6 together with an adhesive curing catalyst, said catalyst being present in an amount equivalent to 0.25 to 5 weight percent based on said urea-formaldehyde reaction product.

8. A method for preparing a resin forming composition useful in an adhesive composition which method comprises admixing an aqueous non-resinous urea-formaldehyde reaction product having 60–90% by weight total solids, a mol ratio between 4.0 and 7.3 mols of formaldehyde per mol of urea and a pH of at least 7.0 with an amount of an ingredient selected from the group consisting of ammelide, ammeline, and mixtures thereof, and urea, so that the total mol ratio of formaldehyde in the composition for every $NH_2$-group present in the composition is in the range of from 0.7 to 1.0 and the total mol ratio of urea to said ingredient present is in the range of from 10 to 30, at temperatures not in excess of 100° F.

9. A process according to claim 8 wherein said ingredient is ammeline.

10. A process according to claim 8 wherein said ingredient is a mixture of ammeline and ammelide.

11. A process according to claim 8 wherein said ingredient is ammelide having a particle size sufficient to pass through a U.S. sieve screen size 80.

References Cited by the Examiner

UNITED STATES PATENTS 2,236,184   3/1941   Menger _____ 260—29.4

MURRAY TILLMAN, *Primary Examiner.*

J. C. BLEUTGE, *Assistant Examiner.*